June 1, 1965
D. MacDONALD
3,186,895
INTEGRATING FILMS AND POROUS BODIES
Filed Oct. 2, 1959
3 Sheets-Sheet 1
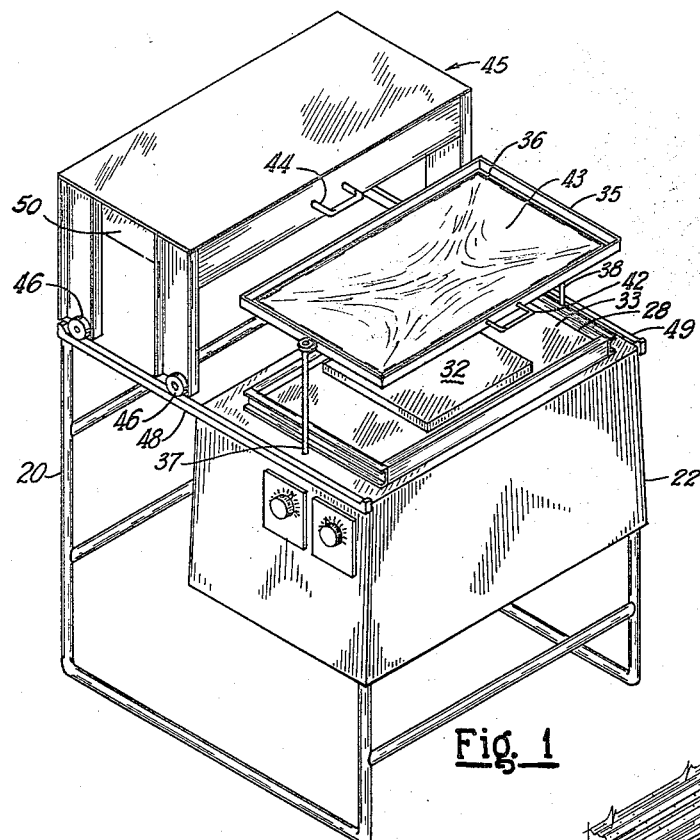
Fig. 1
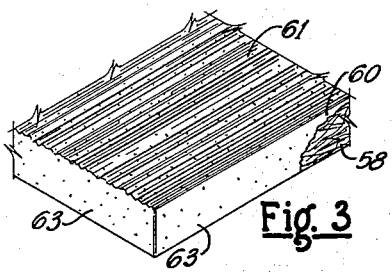
Fig. 3
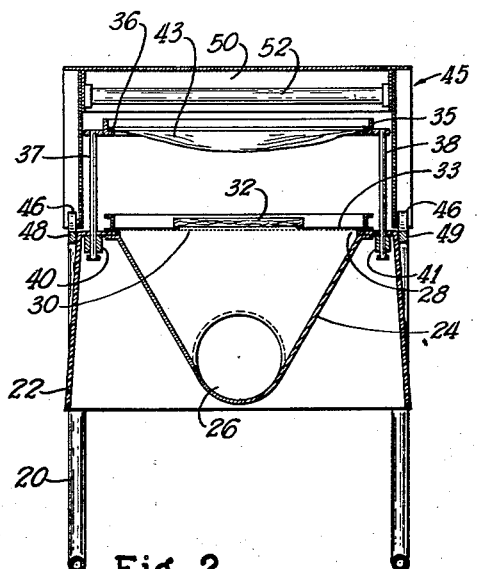
Fig. 2
Fig. 4
INVENTOR.
DONALD MacDONALD
BY
ATTORNEYS

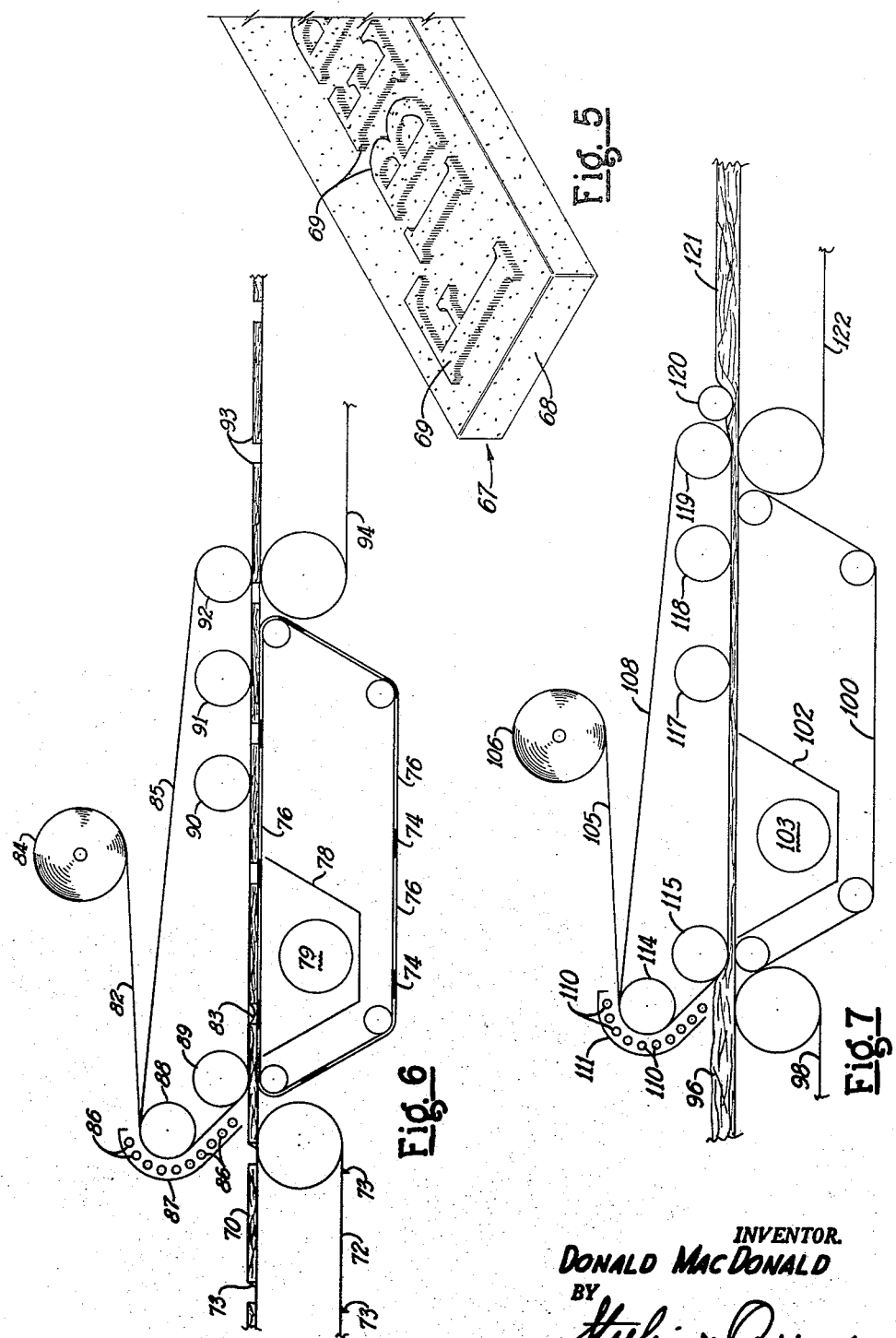

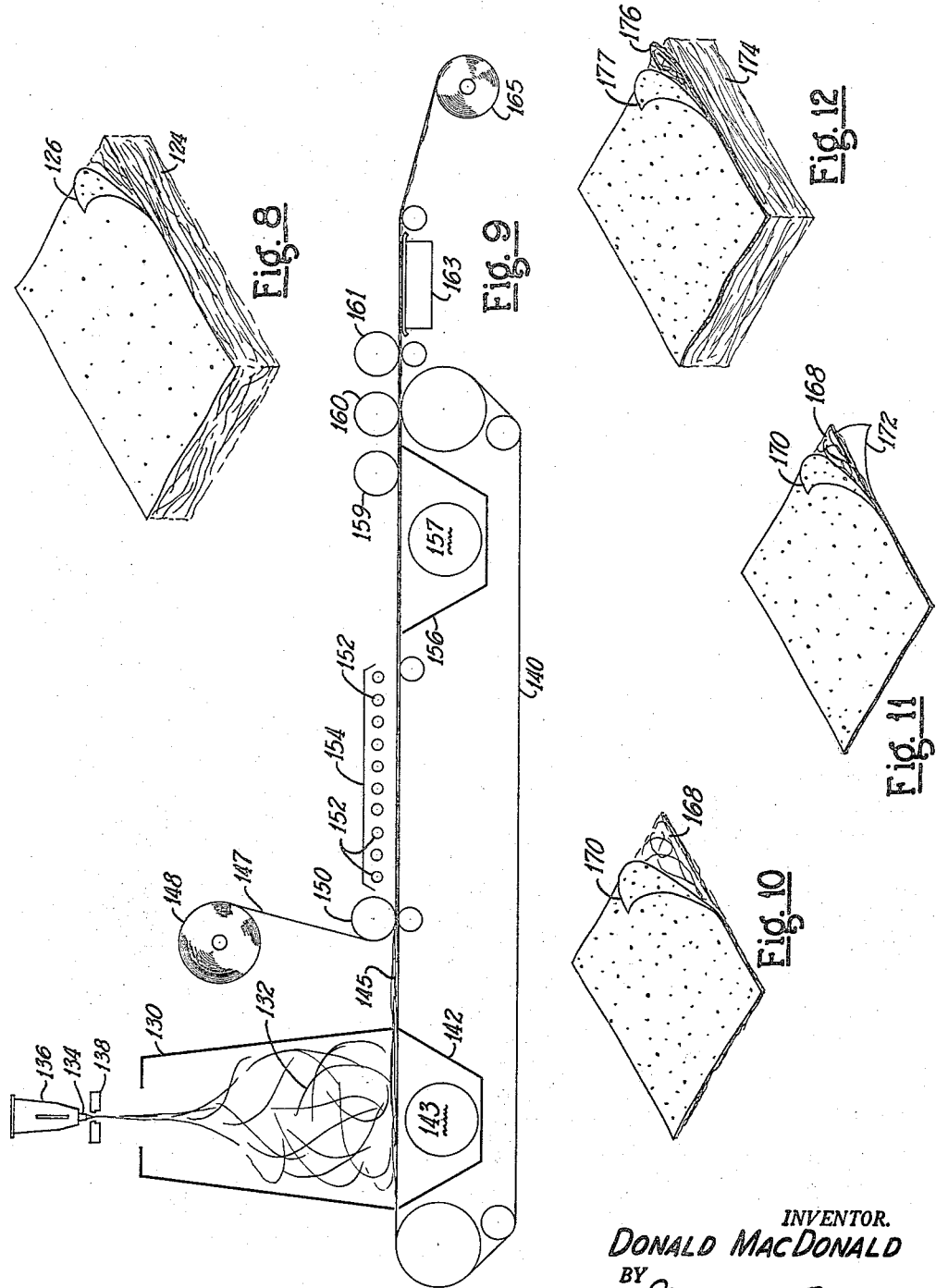

United States Patent Office 3,186,895
Patented June 1, 1965

3,186,895
INTEGRATING FILMS AND POROUS BODIES
Donald MacDonald, Los Altos, Calif., assignor to Owens-Corning Fiberglas Corporation, a corporation of Delaware
Filed Oct. 2, 1959, Ser. No. 844,081
7 Claims. (Cl. 161—119)

This invention relates to methods and apparatus for the application of films to porous boards, webs and sheets and to products resulting therefrom.

More particularly, the invention pertains to the intimate integration of films and porous products in a manner developing unique surfacing characteristics as well as binding and adhesive properties in the film component.

While especially applicable to articles of fibrous glass, the invention may be advantageously practiced with suitably porous bodies of other fibers, open cell foamed plastics and low density woods.

As fibrous glass products are well known and their exceptional qualities recognized, the invention will be explained in connection with various structures of glass fibers with emphasis upon those for acoustical treatment.

Considerable effort has been expended to produce acoustical tiles and other wall boards of fibrous glass which are attractive in appearance and which will retain good acoustical properties, and it is a prime purpose of this invention to contribute to the improvement of such products.

One type of acoustical panel which has enjoyed considerable commercial success is covered by a plastic envelope. This covering must be of a nature to transmit sound waves into the main body of the board. For this reason, it is impervious and of a vibratory character. The smooth surface presented by this plastic covering may be decorated in different colors and patterns and through such means may be made attractive. However, there is a considerable demand for panels with embossed or otherwise configured surfacing which are not available with this type of product.

Other acoustical boards composed of bonded fibers carry coatings of paint over various surface configurations such as striations, pebbling, and fissures. It has been somewhat difficult to apply paint to such surfaces because of the uneven nature thereof and also because the deposit of paint is apt to lower the acoustical property of the boards. Such painted faces are easily marred, are hard to clean and their appearance deteriorates when washed.

Another disadvantage in connection with such panels is the time and equipment involved in their manufacture in which paint spray booths and solvent drying ovens are required.

Such difficulties are not restricted to coated acoustical panels as they are encountered in surfacing other fibrous products and those of like porosity. It is then the broad object of the invention to create a coating of unique properties upon a porous body.

More particularly, an object of this invention is the employment of plastic films of thin thickness dimension in place of paint coatings or heavy plastic sheets formerly used.

Still more specifically, it is an object of the invention to provide a method utilizing an unbalance of air pressures, together with a temporary softening of the film involved, in applying a plastic film to the irregular or contoured surface of a porous body.

A further object is to provide a method for utilizing a light resinous film to integrate a loose porous body of fibers.

Another object of the invention is the provision of means for joining together by a resinous film a thin mat of fibers and a fibrous panel.

A further object of the invention is to utilize the porosity of the acoustical blank in creating an acoustical panel of fibrous glass having an air permeable cover.

Another object of the invention is the provision of a method for creating a bonded mat of fibrous glass.

A still further object is to provide a process for producing a film coating upon flexible webs of glass fibers.

An additional object is a method of forming signs or similar contoured products utilizing porous bodies of bonded glass fibers as molds and, if desired, incorporating the bodies as permanent backings of the products so formed.

A related object is to provide products resulting from the practice of the methods recited above.

These and other objects of the invention are secured in part by drawing a heat softened film of thermoplastic, by air suction applied through a porous panel of fibrous glass, down into merging association with the fibers and configurations of the surface of the panel. The application of heat to the film is so controlled that the film is brought to a semi-fluid point where it has lost almost all strength of coherence and adapts itself completely to the irregularities of the surface of the panel.

Alternately, air pressure above the film may be employed either with or without suction applied beneath the porous panel.

While the preferred film is of polyethene, other thermoplastics such as vinyl or even thermosetting resinous films may be used. While film thicknesses in the region of two to seven mils are preferred, heavier sheets may be feasible. They should, however, be capable of being temporarily softened by heat or solvent to a weak coherency without becoming too sticky.

The film coating thus applied not only follows closely the general surface contour but on a minute scale drapes over individual fibers and small projections and is drawn into small cavities and fissures. At the same time, the film maintains a certain continuity in spite of its detailed disfiguration.

The resulting film coating is unlike a coating of paint in that it is not thickened in cavities or along ridges and uniformly reaches the sides of projections and cavities as well as the top and bottom of such surface contours.

The film not only comprises a unique coating in its manner of complying and integrating with the surface upon which it is deposited, but has also surprising properties of binding together the elements of the body to which it is joined and may also serve as an adhesive element between a first porous element and a second body below it. In this aspect the film may substantially lose its coating character.

The merging association of the film with the surface may be accompanied, as is desired particularly in acoustical products, by the development of porosity in the film under the piercing tendency of the positive or vacuum induced air pressure. Such porosity is supplementally desirable as it permits subsequent film coatings to be applied to either side of the still porous body in the manner prescribed by the invention.

Means by which these objects and advantages are attained will be brought out hereafter in more detail in connection with the accompanying drawings in which:

FIGURE 1 is an isometric view of apparatus designed for practicing the invention;

FIGURE 2 is a vertical section through the forward end of the apparatus of FIGURE 1 with the heater carriage moved forwardly from its retracted position in which it is shown in FIGURE 1;

FIGURE 3 is a perspective view of a portion of an acoustical tile or board, having a striated surface film-coated by the apparatus of FIGURES 1 and 2;

FIGURE 4 illustrates a portion of an acoustical tile like that shown in FIGURE 3, but inverted and with a second film applied to the opposite side thereof;

FIGURE 5 is a perspective view of a sign with raised letters with a film coating applied with the apparatus of FIGURES 1 and 2;

FIGURE 6 is a diagrammatic, longitudinal sectional view of equipment adapted for producing film-coated tiles, such as that pictured in FIGURE 3 on a high production basis;

FIGURE 7 is a like section of apparatus for applying film to a continuous web of fibrous glass;

FIGURE 8 is a perspective view of a portion of a web of fibrous glass carrying a film applied by the apparatus of FIGURE 7;

FIGURE 9 is a diagrammatic illustration in longitudinal section of apparatus for creating a bonded mat of fibrous glass;

FIGURE 10 is a perspective view of a bonded mat of fibrous glass constructed by the apparatus of FIGURE 9 in accordance with this invention;

FIGURE 11 is a perspective view of the bonded mat of FIGURE 10 with an additional film applied to the back side thereof; and FIGURE 12 is a perspective view of a fibrous glass web with a bonded mat applied thereto.

Referring to the drawings in more detail, the apparatus of FIGURES 1 and 2 has a tubular supporting frame 20 on which is mounted a casing 22. Within the casing is a funnel 24 flaring upwardly from suction piping 26 to the opening 28 covered by a screen 30. Upon the screen is positioned a panel 32 to which a film coating is to be applied.

In this instance, panel 32 is basically an acoustical tile of glass fibers held together by a binder such as a thermo-setting melamine or phenol formaldehyde resin. The fibers of such a unit usually are of a size having diameters between twelve and twenty-two, hundred-thousandths of an inch, which are compacted to a porous mass dimensionally stabilized by the binder with a density of eight to sixteen pounds per cubic foot.

The border of the screen surrounding the panel and immediate to the edge of the panel is covered by a mask 33. This is preferably of paper for disposability, but may of course be of most any composition. A vertically movable frame 35 is mounted over the opening 28 upon rods 37 and 38 which are frictionally supported in bores of guide blocks 40 and 41. A handle 42 is provided for vertically moving the frame 35. A plastic film 43 preferable of polyethylene with a thickness of two to four mils is secured at its edges within the frame by the weight of a removable rectangular holder 36. This film may be variously pigmented or imprinted for decorative purposes.

This plastic film to be applied to the panel 32 is heated by raising frame 35 to the upwardly extended position shown in FIGURE 1, and then, by handle 44, pulling out carriage 45 with its rollers 46 running in tracks 48 and 49. The upper compartment 50 of the carriage is thus brought immediately above the frame 35 and the film 43 held therein.

Within compartment 50 are strip heating elements 52 which radiate heat down upon the film. From the effect of this heating, the film first expands because of its coefficient of expansion, and then contracts due to the molecular memory of its composition. After a very short interval, the plastic again expands as it is brought to a stage where it is softened beyond a self-supporting condition. This point is indicated by a second slight sagging of the film from the plane of the frame, but may be automatically determined with heat control elements and a timing device housed within casing 22.

The frame 35 is then brought downwardly to lay the film over the panel 32 placed upon the screened opening 28. Air is drawn down through the porous body of the panel by the vacuum pump associated with piping 26. This air movement with atmospheric pressure above the film pulls the semi-fluid plastic film down into very intimate contact with the surface of the panel.

The soft and pliable condition of the plastic results in its being wrapped around individual fibers and causes it to descend into various depressions in the panel surface while coating the walls of such cavities. The plastic is likewise drawn around and upon the sides of projections in the panel surface and down over the side edges of the panel. The tight embracing of the side edges by the film is due to the essential masking of the surrounding screen at least to the border of the panel.

The masked area may extend beneath the panel with no loss of function and be used in cooperation with a raising of the panel after the top and sides thereof have been covered by the film to pull the film under and against the border of the bottom of the panel.

The thin plastic film is in such a weak state that the impact of atmospheric air against its surface creates small pin holes and thereby develops porosity in the film. The porosity is obtained by control of the film composition and thickness, the temperature and the vacuum induced pressure. The air passing through these pin holes as well as surrounding air then cools the plastic film and sets it within a few seconds in the configurations by which it has been driven by atmospheric pressure against the panel. The characteristic shrinking of the polyethylene film on cooling further tightens the film against the sides of the panel and presses it more vigorously against the surface contour.

The panel 32 to which a film coating has been applied by the apparatus of FIGURES 1 and 2 may constitute the usual type of acoustical tile to be mounted in series on ceilings and walls. Such a tile frequently has a textured surface, for instance, a pebbled effect or one with striations or grooves as illustrated in FIGURE 3. As there indicated, the film coating 60 follows very accurately the irregularities of the striations 61 in the surface of the basic tile 58. Instead of striations, the tile surface may be heavily fissured. It has been found that the basic panel may be impressed by a die with the desired design to crush the fibers and cut deeply into the surface. While the fibers tend to spring back to fill the cracks thus formed, under the pressure applied in the subject process, the film reopens and descends into the cracks to create the desired fissured effect.

With all of these variously textured surfaces, the film has not only been drawn intimately and self-adheringly into the surface of the tile, but has also been pressed against the sides 63 under the effect of the suction action drawing air through the porous body of the tile. The acoustical property of the panel 58 is not impaired by the film due to the porosity developed therein in the applying operation.

When it is desired to put a sealing coat on the back of the tile, it may be reprocessed through the apparatus of FIGURES 1 and 2 in an inverted position by placing it on the screen 33 with the striated surfaces 61 faced downwardly. A second film 65 is then drawn by suction down upon the rear face of the panel and over the sides thereof. Since the first film applied is porous, air is drawn down through this film as well as through the body of the panel.

Such a double coated acoustical panel is illustrated in FIGURE 4, with the basic fibrous panel indicated at 58, the porous film 60 overlying the striated surface 61 and underlying the sides. Over the back and on sides of the panel is the non-porous sealing film 65.

The composition of the rear sealing film may be the same as that of the porous film, but with its imperviousness retained through the use of a lower heating temperature or by the application of air suction of less strength.

A panel with heavy surface engravings or with letters for use as a sign may also have a film coating applied with the apparatus of FIGURES 1 and 2. Such a panel is illustrated in FIGURE 5. This panel indicated generally as 67 has preferably a body of fibrous glass, although it may be composed of some other porous material such as an open cell foamed plastic or a low density wood.

Boards of foamed urethane, phenolic and vinyl with open cell structure are available. Other foamed compositions may have their normally closed cells made interconnecting by being subjected to high air pressure.

Letters may be cut from the same or some other light porous material and temporarily pinned or adhered to the surface of the basic panel as shown at 69. Then through apparatus on the order of that of FIGURES 1 and 2, a film is drawn over the figured surface of the panel and down along the sides thereof. Because of the soft condition of the film, it is drawn down into the hollow portions of the letters and neatly along the edges of them. The film becomes tightly bonded to the letters and the surrounding face of the panel and, in shrinking, fixes the letters rigidly in position.

The bonded glass fiber bodies make ideal core material for the manufacture of signs with the vacuum process of the invention because of their uniform and practically continuous porosity. These fibrous bodies are also inexpensive and still provide sufficient rigidity to prevent depression of convex portions of signs. Because of the inert nature of the fibrous glass, the signs so produced are more durable than many made with conventional methods.

Instead of serving as permanent backing, the fibrous glass bodies may be utilized simply as molds for forming signs with heat softened plastic sheets of heavy gauge. The temperature or plastic composition may be selected to avoid adherence to the glass fiber core. If the film shrinkage prevents a quick release of the glass stock, the latter may be easily broken and removed. This would be quite impossible with metallic dies. Such metal dies would also be inferior as it is very difficult to perforate them uniformly and to locate perforations on the corners of the dies. This lack of perforations in the edge portions results in wide radii at the base of letters, limiting design and letter spacing.

Should the film applied to cores of fibrous glass be made porous in the vacuum forming operation, it will permit air to be drawn therethrough in applying a sealing film on either the front or the back side, if such added coating is considered advisable. If a sign with recessed figures or a panel with a deep intaglio design is desired, the letters or design may be cut out of the basic panel and the film in the forming operation will be forced snugly into the figured cavities.

In FIGURE 6 an apparatus is diagrammatically shown by which acoustical tiles and other types of panels may be coated with a film at a high rate of production. As there pictured, the basic panels 70 are delivered to the apparatus on a conveyor 72 with pusher lugs 73 by which the panels are uniformly spaced as they are discharged.

The panels 70 are received from conveyor 72 by a masking conveyor 74 operated in synchronism with the delivery conveyor 72. The conveyor 74 has a series of meshed openings 76 which are so spaced that each receives a panel 70 thereover from conveyor 72. A vacuum chamber 78 is positioned below the upper flight of conveyor 74. Air is drawn from this chamber by a suitable suction pump or fan through outlet 79.

The film 82 applied to the surfaces of the panel 70 is pulled from a supply roll 84 by the foraminous carrier belt 85. This belt takes the film 82 past heating elements 86 under hood 87. The film follows the belt 85 around drums 88 and 89, the latter of which may be independently heated. Both drums may be perforated with a light suction developed within them to help hold the heat weakened film upon the carrier belt 85. The film is brought by the belt against the upper surface of the panels 70 arriving from conveyor 72.

Air drawn into chamber 78 pulls the film down upon the upper surface of the porous panels 70 and also is indicated at 83 causes the film to descend between the panels and thus be deposited against adjacent edges of the panels. In a similar manner, the film is drawn downwardly against the side edges of the panels which extend longitudinally of the conveyor 74.

With the film intimately integrated with the surfaces of the panels, the resulting composite units pass beneath cooling rolls 90, 91 and 92. These complete the setting and stabilizing of the film which is first initiated by the air flow into vacuum chamber 78. The coated panels 93 reach the final conveyor 94 upon which the unattached film edges may be removed by shearing means.

If the panels 70 are not carried through the apparatus of FIGURE 6 too rapidly, the heating elements 86 may be placed immediately above the panels as they cross over vacuum chamber 78. The film 82 is thus drawn down and firmly held against the panel before being heated to the softening and adhering temperature.

The apparatus of FIGURES 1 and 2 may also be modified in order to follow this alternate procedure. The frame 35 thereof would be omitted as the precise placement it provides would not be necessary. Instead, the plastic film 43 would be positioned by hand upon the panel 32. The vacuum creating pump is then actuated to cause the film to be impelled against the panel by the downward push of atmospheric pressure. Heaters 52 are next brought into position to raise the film to the desired temperature. The heater assembly is shortly thereafter removed to permit cooling and setting of the film in bonded relation with the panel.

The apparatus of this invention and a modified form of the principal method thereof may be utilized in applying an impervious, vibratile film upon the face of a panel of bonded mineral fibers. In order to readily admit sound waves such a film should be of light gauge and should not be directly adhered to the face of the panel. For producing a panel with such a covering, the plastic film is heated below the heat sealing range of temperatures of the particular plastic involved instead of in the upper portion of or above this range when it is desired to intimately integrate the film with the panel surface.

In this regard the heat sealing range of polyethylene is generally given as 250° to 375° F. and the like range for polyvinyl chloride is 200° to 400° F. An unplasticized film of this latter plastic is preferred for this modified method in which it would be brought to a low, softening temperature around 125° F. This application of heat to the film may be done before or after the film is positioned over the porous panel of fibrous glass. As the film is not brought to an adhering condition an adhesive is applied first to the vertical edges of the blank period, but not in a manner to destroy the full porosity of the edges. Suction from under the panel pulls the elastic film down over the panel and against the screened support around it. This action coupled with air drawn into the vertical edges forces the film into attachment therewith.

Upon cooling the film is left in smooth, unattached form over the face of the panel, is firmly adhered to the edges, and lies neatly without folds around the corners of the panel. Because of its unplasticized nature, the film is set with excellent dimensional stability and without undue tautness. As a matter of cost and for best sound transmission, the film is preferably of light gauge. One with a thickness of two mils has been found to function very satisfactorily and to have ample strength.

A film 147 from supply roll 148 is then laid over the loose fibrous mat 145 by the compression roller 150. The mat with the overlay of film then passes beneath the series of heating elements 152 beneath hood 154. The film is softened thereby to a point approaching disintegration, and while in such a state is forced down into the fibrous mat by air drawn through the conveyor into chamber 156 and out discharge piping 157. As in applying the film to a fibrous glass blanket or web, better integration of the film with the fibrous mat may be secured by supplementing the suction induced pressure with an opposed direct pressure supply.

The film thus becomes intimately integrated with the fibers, and the composite mat structure is solidified by the cooling action of the air movement and by contact with the cooling rolls 159, 160 and 161. In order to determine whether there is a uniform distribution of fibers in the bonded mat product, the continuous web is passed over an inspection box 163 from which a strong light is cast upwardly through the web. The product is finally wrapped in a roll 165 for subsequent handling.

The bonded mat of glass fibers produced in accordance with the precepts of the invention may be used for various purposes, such as a surfacing element for other fibrous bodies or molded products, battery retainers and pipe wrap. In the latter instance, it may be further coated with an asphaltic compound.

A piece of the bonded mat is pictured in FIGURE 10 wherein the fibers are indicated at 168 and the film coating at 170. In this showing the coating is depicted in much less association with the fibers than would ordinarily to the case.

If the coating 170 is made porous in the bonding operation provided by the apparatus of FIGURE 9, the mat may be reprocessed according to the invention to apply an impervious film 172 to the opposite side as illustrated in FIGURE 11.

Also the porous mat may be substituted for the films 82 and 105 depicted with the apparatus of FIGURES 6 and 7 and through resoftening of the film constituent be attached to the panels 70 or the thick web 96. The softened film then is drawn down through the fibers of the mat and acts as an adhering agent to join the mat to the underlying fibrous bodies. In this instance, the film acts not only as a binder in the mat, but also as an adhesive between the mat and the fibrous base material.

In FIGURE 12 is illustrated a thick web 174 of fibrous glass to which has been affixed through the above described procedure, a bonded mat containing fiber elements 176 and a film component 177. Since this composite structure is still porous, further film coatings may be applied to either side thereof.

Instead of using loose fibers in the process described in connection with FIGURE 9 to form a bonded mat, a thin mat already held together by a binder may be utilized and an impervious film combined therewith through the operation of the apparatus.

Alternately, cut strands or rovings of glass fibers may be substituted for the fibers. Because of the bulk of such cuttings, the resulting composite body will not be as integrated as that containing dispersed single fibers, but is of special utility in molding or laminating procedures wherein it provides cut strands or rovings in a uniform distribution for reinforcing purposes. The glass strands and film composite may also be vacuum formed into shaped units to serve as blanks for further finishing by spray coatings or other means into final products.

An apparatus similar to that shown in FIGURE 6 is illustrated in FIGURE 7, but is there pictured applying a film to a thick web 96 of fibrous glass. This blanket-type fibrous body is usually between one-half and two inches thick and comprises a resilient, fluffy mass held together by a small constituent of resinous binder. Such a web is frequently used for thermal insulation, but also has good acoustical properties.

As pictured, the web 96 arrives upon delivery conveyor 98 by which it is discharged upon foraminous conveyor 100. Below the upper flight of conveyor 100 is a suction chamber 102 with an exhaust outlet 103. To secure good adhesion between a film and such a low density web (two to four pounds per cubic foot) greater pressure than provided by suction may be necessary. In such an event, a pressure hood is positioned above the web at the location of chamber 102.

Film 105 is fed from a supply roll 106 to a carrier belt 108. The film is transported thereby past a series of heating elements 110 located within hood 111. The belt takes the film around drums 114 and 115, both of which may be perforated with a slight internal suction to assist in retaining the film upon belt 108. Drum 115 may be independently heated and this drum coacts with the cooling drum 117 to temporarily compact the web 96 and to impress the film 105 against the upper surface of the web.

Through the action of the suction of chamber 102, the film is drawn down against the web 96 and in its softened condition engages surface fibers and dips to some extent into depressions in the web. However, for this product, it is ordinarily desired to maintain more completely the flat film character of the coating while securing attachment thereof. The carrier belt 108 serves in accomplishing this purpose by tending to hold the film in a planar state during the full time it is softened by heat.

If desirable, sufficient heat and suction pressure may be utilized to make the film porous through the creation of multiple, pin point orifices. The film is quickly rehardened by the action of the air and also by cooling rolls 117, 118 and 119.

A stripper roll 120 may be utilized to separate the film from conveyor 100 as the film coated web comes from under the roll 119. The coated web 121 then expands back to substantially its original thickness as it arrives upon the discharge conveyor 122. While on conveyor 122, the web may be cut and rolled for stacking and shipment.

A portion of the web product of the apparatus of FIGURE 7 is illustrated in FIGURE 8 with the main fibrous body designated as 124 and the applied film covering 126.

The invention has so far been explained in connection with the formation of porous or non-porous coatings upon bonded or coherent porous bodies. Principles of the invention may also be employed in applying heated film to loose aggregates to integrate them into a mat structure. Apparatus for exploiting this feature of the invention is disclosed in FIGURE 9.

As there pictured, the apparatus includes a conventional hood 130 within which fibers 132 descend after being formed from fine streams of molten glass issuing from nozzles 134 in the bushing 136 located at the base of a forehearth of a glass furnace. These streams of fluid glass are attenuated into fibers by blasts of air or steam from the manifold 138.

As they fall upon foraminous conveyor 140 traveling beneath the hood 130, the fibers 132 are collected in a thin mat 145 possible no more than ten to seventy mils in thickness. The collection and compaction of the fibers is abetted by air drawn through the conveyor into chamber 142 by suction means associated with the outlet 143.

Films of a pressure sensitive adhesive character are available which are temporarily softenable by heat or solvent and which may be attached to porous bodies in accordance with this invention. Such adhered films are particularly advantageous in positioning dunnage forms in shipping containers as well as in applying light insulating boards or webs to wall or ceiling structures. The latter products may, of course, have their outer surfaces protected and decorated by integrated film coatings applied according to the disclosed methods.

While the invention has been described herein in connection with generally flat articles, it is equally adaptable to curved and angular objects for dunnage, pipe coverings and duct insulation.

In the practice of certain phases of this invention, there are conditions and compositions which are quite essential. In the first place, the porosity of the base material should be of a fairly high order. Most acoustical and insulating products of fibrous glass satisfy this requirement while not many insulating boards with other ingredients have sufficient permeability. It is estimated that the minimum porosity should be roughly fifteen percent.

A further requisite is that the plastic film when it is to be integrated with a fibrous surface should be of a type which retains stretch and some smoothness under the high forming heat. This is important in order that the film may be extended around fibers, into cavities, and over projections without total loss of its film character. While some stickiness is required for adherence, many plastics become too sticky to accommodate themselves to irregular contours. For effective results, pressures and temperatures must also be quite accurately controlled on the basis of preliminary trials.

As previously stated, polyethylene film has functioned most satisfactorily for the main method of this invention. While thermoplastics are most readily adapted thereto, thermosetting plastic films may be used in a semi-cured state in which they become momentarily plastic under heat prior to their final hardening.

To promote the development of porosity in the films, particles of pigment having diameters approximating the thickness of the films may be incorporated therein. These will create comparatively weak spots more readily punctured by air pressure. However, in the practice of the invention to date, this technique has not been found necessary.

The integrated films of this invention have unique qualities possessing desirable attributes of both plastic sheet coverings and painted coatings. The films differ from the usual plastic covering sheets in being thinner and hence more flexible, and conforming to minute configurations of the surface to which it is applied. The films also becomes more integrated with the base material and are self-adhering thereto. In addition the subject film may have porosity derived from the process of attachment. Also, the plastic film of this invention may serve as an adhesive agent between adjacent porous bodies to one of which it has first been integrated and for which it may act as a binder.

In comparison to a paint coating, the disclosed film is tougher, more resistant to washing, and presents a continuous surface more agreeable to the touch. These superior properties are particularly apparent when considering the type of paint customarily applied to the face of acoustical panels. To allow sound waves to pass through, these paints must not contain more than a small amount of resinous or latex binders. They accordingly are granular, tend to disintegrate under washing and to smudge easily.

The film further distinguishes from paint coatings generally in its uniform deposit within depressions and interstices. In contrast, regular paints are inclined to fill in textured surfaces. The film coating is also solvent-free, not requiring drying ovens nor applicator devices, such as spray nozzles, roller coaters or dip tanks. In consequence, the film coating is of a special, novel nature, not otherwise obtainable and one not believed previously produced upon fibrous or other minutely irregular surfaces.

It is remarkable how the thin film drapes around individual fibers and lies evenly in small cavities and over projections. The intricate fibrous design in the surface of a mat of fibers is substantially retained, although covered by the film. Even the tiny veins and fine blade contours of an interposed fern leaf are reproduced in the film.

The nearest approach to a similar coating would possibly be achieved by tediously directing a light spray of fast drying material from various angles upon the surface. However, in such a procedure, there would be a heavier deposit upon the high spots and air within tiny pockets would resist the entry of the paint particles and thus limit the coating of such cavities. In addition, the film is drawn into undercut portions and somewhat beneath fibers, areas which would not be reached by the projected spray of paint. The film coating is accordingly unique in its uniformity of thickness and coverage while conforming with the intricate irregularities of a fibrous or other porous surface.

It may be concluded from the preceding detailed disclosure and explanation that novel methods, apparatus and products are involved in this invention and ample means have been provided for attaining the objects earlier recited.

With the benefit of this disclosure, various modifications and substitutions within the spirit of the invention and the scope of the appended claims will likely come to the minds of those experienced in the arts involved.

I claim:

1. A method of coating the fiber textured face of an inherently porous acoustical body of bonded fibrous mineral material which comprises applying a thin substantially fluid, self-adhering, continuous, solidifiable resinous film between two and seven mils in thickness upon said face, drawing air from the interior of the body away from said face to apply pressure to the film sufficient to cause the thin and substantially fluid film to be pressed uniformly into continuously adhering relation with said fiber textured face and in minutely contoured configuration, complying intimately with the fiber textured face and reproducing textured characteristics of said face on the outer side of the resinous film, and, then solidifying the film.

2. A method of coating the fiber textured face of an inherently porous acoustical body of bonded fibrous mineral material which comprises applying a thin substantially fluid, self-adhering, continuous, solidifiable resinous film upon said face, drawing air from the interior of the body away from said face to apply pressure to the film sufficient to cause the thin and substantially fluid film to be pressed uniformly into continuously adhering relation with said fiber textured face and in minutely contoured configuration, complying intimately with the fiber textured face and reproducing textured characteristics of said face on the outer side of the resinous film, and, then solidifying the film, said thin, substantially fluid resinous film having apertures formed therein by the air drawn from the interior of the body when the film is drawn into adhering relation with the fiber textured face of the body.

3. A method of producing a coated composite panel of mineral fibers which comprises placing a thin, substantially fluid, solidifiable, adhesive film upon one surface of a porous, thin, mineral fiber sheet, inserting on the opposite surface of said sheet a porous, comparatively thick body of bonded mineral fibers, forcing the film by air pressure through interstices of the thin mineral fiber sheet into extended adhering association with the underlying comparatively thick bonded fibrous body, said film thus cohering the fibrous sheet and the fibrous body, and then solidifying the film to permanently bond together the film, the fibrous sheet, and the fibrous body.

4. A method of building an integrated composite body of bonded mineral fibers having a contoured surface which comprises positioning separate, figured porous pieces of bonded fibrous mineral material upon a generally planar surface of a larger, porous body of bonded fibrous mineral material, placing an adherable resinous film over the figured pieces and the planar surface, and with the aid of air pressure driving the film into complying and adhering juncture with the pieces and the planar surface to fix the pieces permanently in position upon the porous mineral fiber body.

5. The method of applying a film facing to a porous board of bonded mineral fibers which comprises heating the thermoplastic film to a semi-fluid condition, disposing the thermoplastic film over the face of the porous board, drawing air from the interior of the board away from said face to press the film in its heated condition into conforming and continously self-adhering relation with said face, and while the plastic film is so drawn in conformation with the board face, solidifying and adhering the film to said face by cooling.

6. A porous, insulating, structural body of bonded mineral fibers having an overlay of a thin porous mat and an outer, resinous binder film integrated with the thin porous mat, said resinous binder film extending through interstices of the thin porous mat into attaching relation with the porous structural body of mineral fibers, and holding and integrating the fibrous body and the porous mat together.

7. A light weight contoured surface panel comprising a rigid base of bonded fibrous mineral material, a thin resinous film attached in complying relation over the heavily contoured surface, said contoured surface including spaced elements positioned upon the mineral fiber base without direct attachment thereto, but which are permanently held in preselected positions by the thin resinous film attached to the rigid fibrous base.

References Cited by the Examiner

UNITED STATES PATENTS

| | | | |
|---|---|---|---|
| 2,345,112 | 3/44 | Grundel | 18—56 |
| 2,480,851 | 9/49 | Goss. | |
| 2,493,439 | 1/50 | Braund. | |
| 2,690,593 | 10/54 | Abercrombie. | |
| 2,744,044 | 5/56 | Toulmin. | |
| 2,750,719 | 6/56 | Wandelt. | |
| 2,802,764 | 8/57 | Slayter et al. | 181—33 |
| 2,806,812 | 9/57 | Merz | 156—78 |
| 2,897,109 | 7/59 | Voightman | 156—206 XR |
| 2,903,389 | 9/59 | Fujita. | |
| 2,984,056 | 5/61 | Scholl. | |
| 3,000,772 | 9/61 | Lunn. | |
| 3,043,738 | 7/62 | Demeter et al. | 156—285 |
| 3,056,707 | 10/62 | Helbing et al. | 154—45.9 |

FOREIGN PATENTS

| | | |
|---|---|---|
| 784,503 | 10/57 | Great Britain. |
| 123,758 | 6/45 | Australia. |

EARL M. BERGERT, *Primary Examiner.*

ALEXANDER WYMAN, CARL F. KRAFFT,
*Examiners.*